US011319242B2

(12) United States Patent
Hong et al.

(10) Patent No.: US 11,319,242 B2
(45) Date of Patent: May 3, 2022

(54) BOROSILICATE GLASS WITH HIGH CHEMICAL RESISTANCE AND APPLICATION THEREOF

(71) Applicants: SUNSHINE LAKE PHARMA CO., LTD., Guangdong (CN); NORTH & SOUTH BROTHER PHARMACY INVESTMENT COMPANY LIMITED, Wanchai (HK)

(72) Inventors: Weiqiang Hong, Dongguan (CN); Zhengshang Zhou, Dongguan (CN); Yong Jiang, Dongguan (CN); Lianying Zhu, Dongguan (CN); Xinqian He, Dongguan (CN); Hongxing Han, Dongguan (CN)

(73) Assignee: Sunshine Lake Pharma Co., Ltd., Guangdong (CN)

( * ) Notice: Subject to any disclaimer, the term of this patent is extended or adjusted under 35 U.S.C. 154(b) by 479 days.

(21) Appl. No.: 16/473,246

(22) PCT Filed: Dec. 26, 2017

(86) PCT No.: PCT/CN2017/118437
§ 371 (c)(1),
(2) Date: Jun. 25, 2019

(87) PCT Pub. No.: WO2018/121491
PCT Pub. Date: Jul. 5, 2018

(65) Prior Publication Data
US 2019/0322569 A1 Oct. 24, 2019

(30) Foreign Application Priority Data
Dec. 29, 2016 (CN) .......................... 201611241380.3

(51) Int. Cl.
C03C 3/095 (2006.01)
C03C 13/00 (2006.01)
C03C 4/20 (2006.01)
C04B 14/44 (2006.01)

(52) U.S. Cl.
CPC ................ *C03C 3/095* (2013.01); *C03C 4/20* (2013.01); *C03C 13/001* (2013.01); *C03C 13/002* (2013.01); *C04B 14/44* (2013.01); *C03C 2204/00* (2013.01); *C03C 2213/00* (2013.01)

(58) Field of Classification Search
CPC ........... C03C 3/095; C03C 3/091; C03C 4/20; C03C 13/001; C03C 13/002; C03C 13/00; C03C 13/06; C03C 2204/00; C03C 2213/00; C03B 14/44
See application file for complete search history.

(56) References Cited

U.S. PATENT DOCUMENTS

| 4,562,161 | A | * | 12/1985 | Mennemann | ........... | C03C 3/118 501/59 |
| 6,204,212 | B1 | | 3/2001 | Schott | | |
| 6,794,323 | B2 | | 9/2004 | Schott | | |
| 9,643,882 | B2 | | 5/2017 | Tratzky et al. | | |
| 2003/0087745 | A1 | | 5/2003 | Peuchert et al. | | |
| 2007/0270300 | A1 | | 11/2007 | Kurachi et al. | | |
| 2012/0095149 | A1 | * | 4/2012 | Sawanoi | ................. | C03C 13/00 524/494 |
| 2015/0266769 | A1 | * | 9/2015 | Nishida | ................... | C03B 37/02 501/38 |
| 2016/0107924 | A1 | * | 4/2016 | Yamamoto | ............. | C03C 3/093 501/67 |
| 2016/0326045 | A1 | * | 11/2016 | Li | ........................... | C03C 3/095 |
| 2019/0144329 | A1 | * | 5/2019 | Inaka | .................. | D03D 15/267 428/220 |
| 2020/0148586 | A1 | * | 5/2020 | Yokota | .................... | C03C 13/00 |

FOREIGN PATENT DOCUMENTS

| CN | 1634784 A | * | 7/2005 | ......... C03B 37/0124 |
| CN | 1634785 A | * | 7/2005 | ............ C03C 3/095 |
| CN | 104261676 A | * | 1/2015 | |
| CN | 104261676 A | | 1/2015 | |
| CN | 104556689 A | | 4/2015 | |
| JP | 03197355 A | * | 8/1991 | ............ C03C 14/00 |
| WO | WO-2014196655 A1 | * | 12/2014 | ............ C03C 3/091 |

OTHER PUBLICATIONS

International Search Report of PCT/CN2017/118437.
Written Opinion of PCT/CN2017/118437.
English Abstract of CN104261676.
English Abstract of CN104556689.

* cited by examiner

*Primary Examiner* — Elizabeth A. Bolden
(74) *Attorney, Agent, or Firm* — Kam Wah Law

(57) ABSTRACT

The invention discloses a borosilicate glass with high chemical resistance and an application thereof. The borosilicate glass contains 0.25-4.0 wt % of $Y_2O_3$ based on the oxide. The borosilicate glass has a high chemical stability, a suitable linear thermal expansion coefficient and is suitable for use in the field of pharmaceutical packaging materials.

19 Claims, No Drawings

BOROSILICATE GLASS WITH HIGH CHEMICAL RESISTANCE AND APPLICATION THEREOF

CROSS REFERENCE TO RELATED APPLICATIONS

This is a U.S. national stage application of the International Patent Application No. PCT/CN2017/118437, filed Dec. 26, 2017, which claims priority to Chinese Patent Application No. 201611241380.3, filed Dec. 29, 2016, both of which are incorporated herein by reference in their entirety.

FIELD

The present invention relates to a borosilicate glass with high chemical resistance and applications thereof.

BACKGROUND

In recent years, there are more and more alkaline drugs (such as PH ≥10) in the pharmaceutical market. The use of glass containers that do not meet the requirements of alkali resistance is prone to the phenomenon of glass detachment. This drug injected into the human body for a long time can cause serious reactions such as sepsis, etc. Therefore, the pharmaceutical industry has placed a higher demand on the main packaging materials, providing a packaging material with significantly improved alkali-resistant.

Due to its excellent properties, such as high chemical stability, high thermal shock resistance and low coefficient of linear thermal expansion, borosilicate glass is especially applied in pharmaceutical packaging industry (e.g., ampoules and vials for injection), instruments and equipment used in chemical industry production and testing, or alloy sealing.

When borosilicate glass is used as a primary pharmaceutical packaging material such as ampoules or vials, it is required that the glass has very high corrosion resistance to acidic and alkaline media and water resistance. Moreover, the low coefficient of thermal expansion is advantageous for ensuring good thermal stability. In addition, the physical-chemical properties of the glass during further processing are important because they have an impact on the properties and applications of the final products. To date, known industrial pharmaceutical ampoules have HGB class 1 water resistance (H, according to YBB00362004-2015), class 1 acid resistance (S, according to YBB00342004-2015) and class 2 alkali resistance (L, according to YBB00352004-2015). The representative of the prior art is transparent glass FIOLAX™. However, the actual experience shows that in order to ensure the alkali resistance in the production process, it is required to develop a glass with a weight loss less than 75 mg/dm$^2$ in the laboratory, that is, in the range of class 1 alkali resistance, at the same time without damaging other important glass properties, such as maintaining HGB class 1 water resistance and class 1 acid resistance, etc.

Although the prior patent documents have described glass with high chemical resistance, the glass still needs to be further improved. Improving its alkali resistance and/or having a suitable coefficient of linear thermal expansion is particularly required.

DE42306074C1 mentions a silicate glass with high chemical resistance, which has a low content of alkali metal and a low content of $Al_2O_3$, and can be fused with tungsten, but have a coefficient of linear thermal expansion up to $4.5 \times 10^{-6}$/K.

The borosilicate glass disclosed in DE3722130A1 has a high chemical stability. Although these glasses belong to HGB class 1 water resistant glass, they are still relatively easy to crystallize due to not containing $K_2O$.

The glasses described in DE 19842942A1 and DE19536708C1 have a very high chemical stability, up to HGB class 1 water resistance, class 1 acid resistance, class 1 alkali resistance. However, due to a high content of $ZrO_2$ in these glasses, the glass is also relatively easy to crystallize.

SUMMARY

Provided herein is a borosilicate glass comprising 0.25-4.0 wt % of $Y_2O_3$ based on oxide.

In some embodiments, the borosilicate glass disclosed herein comprises the following constituents based on oxide:
$SiO_2$ 70-77 wt %,
$B_2O_3$ 9.0-12 wt %,
$Al_2O_3$ 3.0-7.0 wt %,
$Na_2O$ 5.0-8.0 wt %,
$K_2O$ 0-2.0 wt %,
$Li_2O$ 0-1.0 wt %,
wherein $\Sigma(Na_2O+K_2O+Li_2O)$ 5.0-9.0 wt %,
CaO 0-3.0 wt %,
MgO 0-1.0 wt %,
BaO 0-2.0 wt %,
wherein $\Sigma(CaO+MgO+BaO)$ 0-5.0 wt %,
$CeO_2$ 0-1.0 wt %,
NaCl 0-1.0 wt %,
$Y_2O_3$ 0.25-4.0 wt %.

In certain embodiments, the borosilicate glass disclosed herein comprises the following constituents based on oxide:
$SiO_2$ 70-76 wt %,
$B_2O_3$ 9.0-11.5 wt %,
$Al_2O_3$ 3.5-6.5 wt %,
$Na_2O$ 5.0-7.0 wt %,
$K_2O$ 0-1.0 wt %,
$Li_2O$ 0-1.0 wt %,
wherein $\Sigma(Na_2O+K_2O+Li_2O)$ 6.5-8.0 wt %,
CaO 0-2.0 wt %,
MgO 0-1.0 wt %,
BaO 0-1.5 wt %,
wherein $\Sigma(CaO+MgO+BaO)$ 0-5.0 wt %,
$CeO_2$ 0-0.5 wt %,
$Y_2O_3$ 0.5-3.5 wt %.

In other embodiments, the borosilicate glass disclosed herein comprises the following constituents based on oxide:
$SiO_2$ 71-75.5 wt %,
$B_2O_3$ 9.1-11.0 wt %,
$Al_2O_3$ 3.8-6.5 wt %,
$Na_2O$ 5.5-7.0 wt %,
$K_2O$ 0-1.0 wt %,
$Li_2O$ 0-0.5 wt %,
wherein $\Sigma(Na_2O+K_2O+Li_2O)$ 6.0-8.0 wt %,
CaO 0-1.5 wt %,
MgO 0-0.5 wt %,
BaO 0.5-1.5 wt %,
wherein $\Sigma(CaO+MgO+BaO)$ 0-4.0 wt %,
$CeO_2$ 0-1.0 wt %,
NaCl 0-1.0 wt %,
$Y_2O_3$ 0.5-3.0 wt %.

In some embodiments, the borosilicate glass disclosed herein comprises at least one of $La_2O_3$, $ZrO_2$, and ZnO in an amount from 0 to 4.0 wt %; or at least one of $La_2O_3$, $ZrO_2$, and ZnO in an amount from 0 to 3.0 wt %.

In certain embodiments, the borosilicate glass disclosed herein has a coefficient of linear thermal expansion $\alpha_{20/300}$ from $4.6 \times 10^{-6}$/K to $5.2 \times 10^{-6}$/K, a class 1 water resistance according to YBB00362004-2015, a class 1 acid resistance according to YBB00342004-2015, and/or a class 1 alkali resistance according to YBB00352004-2015.

In other embodiments, the borosilicate glass disclosed herein is free of $As_2O_3$ and/or $Sb_2O_3$ apart from inevitable impurities.

In some embodiments, the borosilicate glass disclosed herein is used as a packaging material for a pharmaceutical, as a container or a chemical device for a chemically erosive liquid, as a sealing glass for an alloy, or for forming a glass fiber. In further embodiments, the glass fiber is for reinforcing concrete.

DETAILED DESCRIPTION

The present invention aims to solve at least one of the technical problems to some extent in the related art.

Herein, the present invention provides a borosilicate glass which has a weight loss less than 75 mg/dm$^2$ and achieves class 1 alkali resistance (L) while maintaining HGB class 1 water resistance (H) and class 1 acid resistance (S) according to YBB00352004-2015 testing. Further, the glass fiber provided by the present invention has a coefficient of thermal expansion from $4.6 \times 10^{-6}$/K to $5.2 \times 10^{-6}$/K, and has a high heat resistance and a good processability.

According to examples of the invention, the borosilicate glass provided herein, based on the oxide, contains from 0.25 to 4.0 wt % $Y_2O_3$ (yttria), preferably in an amount from 0.5 to 3.5 wt %, particularly preferably from 0.5 to 3.0 wt %. The inventors have found through a large number of experiments that the addition of $Y_2O_3$ can greatly improve the alkali resistance of the glass. When the content of $Y_2O_3$ is 3.0% by weight, the weight loss of the glass is about 40.0 mg/dm$^2$ according to the test method of YBB00352004-2015, and alkali resistance is greatly improved; but when the content of $Y_2O_3$ continues to increase to 4% by weight or more than 4.0% by weight, the glass undergoes phase separation and uneven coloration occurs, and the alkali resistance of the glass is no longer significantly improved, while the transition temperature ($T_g$) and softening temperature ($T_f$) are also improved significantly. In addition, when $Y_2O_3$ is increased to a certain amount, it mainly provides non-bridge oxygen, which plays a significant role in breaking network, destroys the glass network structure, makes the structure loose, and increases the coefficient of linear thermal expansion of the glass sharply. When the content of $Y_2O_3$ added is less than 0.25%, the alkali resistance of the glass in a boil is 85.25 mg/dm$^2$ (>75 mg/dm$^2$), which is a class 2 alkali resistance. When the content of $Y_2O_3$ is in the above range, the alkali resistance belongs to class 1, which is especially important for ensuring the alkali resistance of the glass in the production process.

In some embodiments, the borosilicate glass provided herein, based on the oxide, comprises the following components:

$SiO_2$ 70-77 wt %, $B_2O_3$ 9.0-12.0 wt %, $Al_2O_3$ 3.0-7.0 wt %, $Na_2O$ 5.0-8.0 wt %, $K_2O$ 0-2.0 wt %, $Li_2O$ 0-1.0 wt %, wherein $\Sigma(Na_2O+K_2O+Li_2O)$ 5.0-9.0 wt %, CaO 0-3.0 wt %, MgO 0-1.0 wt %, BaO 0-2.0 wt %, wherein $\Sigma(CaO+MgO+BaO)$ 0-5.0 wt %, $CeO_2$ 0-1.0 wt %, NaCl 0-1.0 wt %, and $Y_2O_3$ 0.25-4.0 wt %.

According to examples of the invention, the borosilicate glass provided herein contains from 70 to 77 wt % $SiO_2$, preferably in an amount from 70 to 76 wt %, particularly preferably from 71 to 75.5 wt %. When the content of $SiO_2$ is within this range, the glass properties can be ensured under the premise of forming the basic skeleton of the glass. A higher content will increase the viscosity of the glass and increase the melting temperature. If the $SiO_2$ content is further reduced, the acid resistance of the glass will be destroyed.

According to examples of the invention, the borosilicate glass provided herein contains from 9.0 to 12 wt % $B_2O_3$, preferably in an amount from 9.0 to 11.5 wt %, particularly preferably from 9.5 to 11.0 wt %. The content of $B_2O_3$ plays a crucial role in reducing the coefficient of linear thermal expansion, processing temperature and melting temperature, and improving chemical stability.

In one aspect, $B_2O_3$ binds the alkali metal ions in the glass more firmly to the glass structure, and the alkali metal ions released are reduced when measuring the water resistance of the glass, and the decrease of $B_2O_3$ content can significantly reduce the water resistance. In a further aspect, the inventors of the present invention have found through a large number of experimental studies that as the content of $B_2O_3$ increases, the viscosity of the glass gradually decreases, and the coefficient of linear thermal expansion gradually decreases. However, when the content is more than 12.0% by weight, the glass may be phase-separated, resulting in uneven internal stress and easy cracking of the glass. The content of $B_2O_3$ is further increased, and boron volatilization is more serious, which not only aggravates the erosion of the refractory material, causes waste of energy, but also causes fluctuations of the chemical composition of the glass. In addition, the higher content of $B_2O_3$ can also adversely affect the acid resistance of the glass. Therefore, the content of $B_2O_3$ should not be too low or too high, and it is preferably within the above range.

According to examples of the invention, the borosilicate glass of the invention contains from 3.0 to 7.0 wt % $Al_2O_3$, preferably in an amount from 3.5 to 6.5 wt %, particularly preferably from 3.8 to 6.5 wt %. $Al_2O_3$, like $B_2O_3$, firmly fixes an alkali metal oxide, especially $Na_2O$, in the glass structure, so an excessively high content will cause an increase in the melting temperature and the processing temperature. In addition, $Al_2O_3$ has a positive effect against crystallization, and lowering the $Al_2O_3$ content may increase the crystallization tendency accordingly.

According to examples of the present invention, it is important that the content of each alkali metal oxide is controlled within a limited range in the glass of the present invention, and the glass properties can be improved by optimizing the combination of the contents of the respective alkali metal oxides. Thus, the glass of the invention contains from 5.0 to 8.0 wt % $Na_2O$, preferably at least 5.5 wt % $Na_2O$, from 0 to 2.0 wt % $K_2O$, preferably from 0 to 1.0 wt % $K_2O$, from 0 to 1.0 wt % $Li_2O$, preferably from 0 to 0.5 wt % $Li_2O$; the total amount of alkali metal oxides is from 5.0 to 9.0 wt %, preferably from 6.5 to 8.0 wt %.

The above alkali metal oxides adjust the properties of the glass within respective upper limits, for example, the cooperation of three plays an important role in adjusting the coefficient of linear thermal expansion of the glass, $Na_2O$ and $Li_2O$ decrease the melting temperature and processing temperature of glass, $K_2O$ and/or $Li_2O$ play a beneficial role in reducing glass crystallization, and it is important to maintain a balanced ratio between them. When the respective upper limits are exceeded, the glass has an excessive coefficient of linear thermal expansion and it is not conducive to reducing costs, while an excessively low content of the alkali metal oxide results in a too low coefficient of linear thermal expansion. Therefore, when the alkali metal oxide content is limited to the above range, borosilicate glass which has a coefficient of linear thermal expansion and a processing temperature satisfying the requirements can be obtained.

According to examples of the invention, the borosilicate glass of the invention, contains from 0 to 5.0 wt % alkaline earth metal oxide, preferably in an amount from 0 to 4.0 wt %. Specifically, the content of CaO is 0-3.0 wt %, preferably 0-2.0 wt %, particularly preferably 0-1.5 wt %; the content of MgO is 0-1.0 wt %, preferably 0-0.5 wt %; the content of BaO is from 0 to 2.0 wt %, preferably from 0.5 to 1.5 wt %. The above alkaline earth metal oxide changes "the length of the material of the glass" which is also the processing temperature range of the glass; in addition, alkaline earth metal oxides reduce the high temperature viscosity of the glass through different network modification, improve chemical stability, and reduce the tendency of crystallization, which match the viscosity characteristics and other properties of the glass with specific production and processing processes. In addition, CaO improves acid resistance, and BaO lowers the processing temperature without adversely affecting water resistance. Excessive content of the alkaline earth metal oxide can result in an increase of the coefficient of linear thermal expansion, while too low content can excessively impair the performance of the glass. Preferably, the total content of the alkaline earth metal oxide is at most 5.0 wt %.

According to examples of the present invention, the borosilicate glass of the present invention may contain up to 1.0 wt % $CeO_2$, and a low concentration of $CeO_2$ is used as a clarifying agent, and a higher concentration of $CeO_2$ can prevent the glass from discoloring due to radioactive irradiation. Therefore, the use of such $CeO_2$-containing glass as a medical packaging material allows the visual inspection of the presence of any particulate matter even when placed in a radioactive irradiation environment. When the concentration of $CeO_2$ is too high, an intrinsic brownish yellow color which does not meet the demand can be generated. Further, if the $CeO_2$ content is too high, the production cost of the glass is greatly increased. Therefore, in the present invention, $CeO_2$ is introduced as a clarifying agent, and the content of $CeO_2$ is preferably between 0 and 0.5 wt %.

According to examples of the present invention, the borosilicate glass of the present invention may also contain 0-1 wt % NaCl which is used mainly as clarifying agent to clarify the glass. In addition to the above-described $CeO_2$ and NaCl, those skilled in the art may also use other standard clarifying agents such as $CaF_2$ and/or sulfates, e.g., $Na_2SO_4$, and/or nitrates, e.g., $NaNO_3$. The above clarifying agent is used in a standard amount, that is, clarification with 0.003-1.0 wt % of the standard clarifying agent depending on the type and amount of clarifying agent in the finished glass. According to examples of the present invention, in addition to the unavoidable impurities, the glass is free of $As_2O_3$ (arsenic trioxide) and $Sb_2O_3$ (antimony trioxide), which is particularly advantageous for glass as a main medical packaging material.

According to examples of the invention, the borosilicate glass of the invention, preferably contains 0.5 to 3.5 wt % $Y_2O_3$, particularly preferably in an amount of 0.5 to 3.0 wt %. The inventors have found through a large number of experiments that the addition of $Y_2O_3$ can greatly improve the chemical stability, especially alkali resistance of the glass. When the content of $Y_2O_3$ is 3.0% by weight, the weight loss of the glass is about 40.0 $mg/dm^2$ according to the test method of YBB00352004-2015, and alkali resistance is greatly improved; but when the content of $Y_2O_3$ continues to increase to 4% by weight or more than 4.0% by weight, the glass undergoes phase separation and uneven coloration occurs, and the alkali resistance of the glass is no longer significantly improved, while the transition temperature ($T_g$) and softening temperature ($T_f$) are also improved significantly. In addition, when $Y_2O_3$ is increased to a certain amount, it mainly provides non-bridge oxygen, which plays a significant role in breaking network, destroys the glass network structure, makes the structure loose, and the coefficient of linear thermal expansion of the glass increases sharply. When the content of $Y_2O_3$ added is less than 0.25%, the alkali resistance of the glass in a boil is 85.25 $mg/dm^2$ (>75 $mg/dm^2$), which is a class 2 alkali resistance. When the content of $Y_2O_3$ is in the above range, the alkali resistance of the glass obtained belongs to class 1, and the water resistance and acid resistance also belong to class 1, which is especially important for ensuring the alkali resistance of the glass in the production process.

According to examples of the invention, the glass of the invention may further contain 0 to 4.0 wt % at least one of $La_2O_3$ (lanthanum oxide), $ZrO_2$ (zirconia), and ZnO (zinc oxide). According to examples of the invention, the glass of the invention may further contain 0 to 3.0 wt % at least one of $La_2O_3$ (lanthanum oxide), $ZrO_2$ (zirconia), and ZnO (zinc oxide). In another word, the glass of the invention may further optionally contain 0 to 4.0 wt %, preferably any one of 0-3.0 wt % $La_2O_3$ (lanthanum oxide), $ZrO_2$ (zirconia), and ZnO (zinc oxide); according to other embodiment, the glass may also optionally contain two of $La_2O_3$ (lanthanum oxide), $ZrO_2$ (zirconia), and ZnO (zinc oxide), the content of each oxide is independently from 0 to 4.0 wt %, preferably from 0 to 3.0 wt %. According to other embodiment, the glass may also contain $La_2O_3$ (lanthanum oxide), $ZrO_2$ (zirconia), and ZnO (zinc oxide) at the same time, the content of each oxide is independently 0 to 4.0 wt %, preferably 0 to 3.0 wt %, that is, when the glass contains various oxides of $La_2O_3$ (lanthanum oxide), $ZrO_2$ (zirconia), and ZnO (zinc oxide), the oxide content are not affected by each other. The glass formed by the combination of $Y_2O_3$ (yttria) and the oxide of above-mentioned content not only does not destroy other production performance parameters, but water resistance, acid resistance and alkali resistance also reaches class 1 at the same time; in addition, $La_2O_3$ (lanthanum oxide), $ZrO_2$ (zirconia) or ZnO (zinc oxide) is cheaper and more readily available than $Y_2O_3$ (yttria), which further reduces production costs.

In some embodiments, according examples of the invention, the glass of the invention based on oxides contains the following components: $SiO_2$ 70-76 wt %, $B_2O_3$ 9.0-11.5 wt %, $Al_2O_3$ 3.5-6.5 wt %, $Na_2O$ 5.0-7.0 wt %, $K_2O$ 0-1.0 wt %, $Li_2O$ 0-1.0 wt %, wherein $\Sigma(Na_2O+K_2O+Li_2O)$ 6.5-8.0 wt %, CaO 0-2.0 wt %, MgO 0-1.0 wt %, BaO 0-1.5 wt %, wherein $\Sigma(CaO+MgO+BaO)$ 0-5.0 wt %, $CeO_2$ 0-0.5 wt %, and $Y_2O_3$ 0.5-3.5 wt %.

In some embodiments, according examples of the invention, the glass of the invention based on oxides contains the following components: $SiO_2$ 71-75.5 wt %, $B_2O_3$ 9.1-11.0 wt %, $Al_2O_3$ 3.8-6.5 wt %, $Na_2O$ 5.5-7.0 wt %, $K_2O$ 0-1.0 wt %, $Li_2O$ 0-0.5 wt %, wherein $\Sigma(Na_2O+K_2O+Li_2O)$ 6.0-8.0 wt %, CaO 0-1.5 wt %, MgO 0-0.5 wt %, BaO 0.5-1.5 wt %, wherein $\Sigma(CaO+MgO+BaO)$ 0-4.0 wt %, $CeO_2$ 0-1.0 wt %, NaCl 0-1.0 wt %, and $Y_2O_3$ 0.5-3.0 wt %.

According to examples of the invention, the coefficient of linear thermal expansion α20/300 of the glass of the invention is from $4.6 \times 10^{-6}$/K to $5.2 \times 10^{-6}$/K, which is similar to that of molybdenum or KOVAR™. Therefore, the glass successfully fusing with molybdenum or KOVAR™, such as an Fe—Co—Ni alloy, can act as sealing glass of such metals. In addition, the glass disclosed has good chemical stability, HGB class 1 water resistance, class 1 acid resistance, class 1 alkali resistance. Due to its high chemical stability, especially excellent alkali resistance and low coefficient of linear thermal expansion, the glass of the invention is particularly suitable for use in packaging materials for pharmaceuticals, as well as equipment and glass instruments in the field of chemical industry production and laboratory.

According to examples of the invention, the suitable melting range and working range of the glass of the invention results in a reduction in energy consumption during production.

In another aspect of the invention, the glass provided by the invention is particularly suitable for use as a pharmaceutical packaging material.

In another aspect of the invention, the glass proposed by the invention is particularly suitable for use as containers and/or chemical devices for chemically erosive liquids.

In another aspect of the invention, the glass proposed by the invention is particularly suitable for use as a sealing glass of glass-metal, such as sealing molybdenum metal or KOVAR™ alloy, etc.

In another aspect of the invention, the glass proposed by the invention is particularly suitable for forming glass fibers used in reinforcing concrete.

EXAMPLES

Embodiments of the invention are described in detail below, examples of which are shown in following tables. The embodiments described in the tables are illustrative and are intended to be illustrative of the invention and are not to be construed as limiting the invention.

Unless defined otherwise, all technical and scientific terms used herein have the same meaning as is commonly understood by one skilled in the art to which this invention belongs. All patents and publications referred to herein are incorporated by reference in their entirety. The term "comprise" or "contain" is an open expression, it means comprising the contents disclosed herein, but don't exclude other contents. In the present invention, all numbers disclosed herein are approximate, whether or not the words "about" or "about" are used. The value of each number may have a difference of less than 10% or a reasonable difference considered by those in the field, such as a difference of 1%, 2%, 3%, 4% or 5%.

Where specific techniques or conditions are not indicated in the examples, they are carried out according to the techniques or conditions described in the literature in the art or in accordance with the product specifications. Any reagents or instruments not indicating manufacturers are commercially available products.

In the examples described below, unless otherwise indicated all temperatures are set forth in degrees Celsius. The reagents used are all commercially available or can be prepared by the methods described herein.

The following abbreviations are used throughout the specification:

In the present invention, the weight percentage (% by weight) of each component is calculated based on oxides.

mg represents milligram, μg represents microgram, $T_g$ represents transition temperature, $T_f$ represents expansion softening temperature, $dm^2$ represents decimeter square, $cm^2$ represents centimeter square, and ° C. represents degrees Celsius;

$SiO_2$: silica, $B_2O_3$: boron oxide, $Al_2O_3$: alumina, $Na_2O$: sodium oxide, $K_2O$: potassium oxide, $Li_2O$: lithium oxide, CaO: calcium oxide, MgO: magnesium oxide, BaO: cerium oxide, $CeO_2$: cerium oxide, NaCl: sodium chloride, $Y_2O_3$: yttrium oxide, $La_2O_3$: lanthanum oxide, $ZrO_2$: zirconia, ZnO: zinc oxide.

Chemical resistance can be tested by the following method:

The testing method of water resistance according to YBB00362004-2015: a certain amount of glass granules with specified size was taken into a specified container, and a certain amount of water was added, the container was heated under specified condition, the water erosion degree of glass particles was measured and graded with the volume of hydrochloric acid titration solution (0.01 mol/L) consumed by glass granules per gram by titrating the leachate. The maximum value of high chemical resistant glass belonging to HGB class 1 water resistance is 0.10 mL. The maximum value of high chemical resistant glass belonging to HGB class 2 water resistance is 0.20 mL. The maximum value of high chemical resistant glass belonging to HGB class 3 water resistance is 0.85 mL.

The testing method of alkali resistance according to YBB00352004-2015: a glass sample having a total surface area of 10 $cm^2$-15 $cm^2$ was etched for 3 hours with an equal volume of 0.5 mol/L sodium carbonate and 1.0 mol/L sodium hydroxide boiling mixed solution. The mass loss per unit surface area of the glass sample was determined. Each example in the table gives weight loss in unit of mg/$dm^2$. The maximum weight loss of a class 1 alkali-resistant glass is 75 mg/$dm^2$. The maximum weight loss of a class 2 alkali-resistant glass is 175 mg/$dm^2$. Glass with a maximum loss more than 175 mg/$dm^2$ belongs to class 3 alkali resistance.

The testing method of acid resistance according to YBB00342004-2015: a glass sample with a total surface area of 100 $cm^2$ was etched for 6 hours in boiling hydrochloric acid solution of 6±0.2 mol/L. The mass loss per unit surface area of the glass sample was determined. Each example in the table gives weight loss in unit of mg/$dm^2$. The maximum weight loss of a class 1 acid-resistant glass is 0.7 mg/$dm^2$. The maximum weight loss of a class 2 acid-resistant glass is 1.5 mg/$dm^2$. Glass with a maximum loss more than 1.5 mg/$dm^2$ belongs to class 3 acid resistance.

The testing method of coefficient of linear thermal expansion (u) according to YBB00202003-2015: a glass block was cut into a glass strip of length×width×height=25×6×6 (error ±0.1 mm) using the micro-controlled inner circular cutting machine (Northwest Machinery Co., Ltd. J5085-1/ZF), then α(20; 300)[$10^{-6}$/K], transition temperature $T_g$ and expansion softening temperature $T_f$ of the glass strip were determined by a thermal dilatometer (Netzsch DIL 402 PC).

Processing temperature (VA): Orton RSV-1600 rotary high temperature viscometer was used, the condition is the weight of quenched glass sample ≥the weight of turn high temperature viscosity glass sample, and the corresponding viscosity is $10^4$ dPa·S.

Tables 1-3 give the composition (weight percent, % by weight or wt %, based on oxide) of different glasses of examples of the invention and important performance parameters thereof, including: coefficient of linear thermal expansion α (20;300) (unit:10-6/K), transition temperature Tg (unit: ° C.), softening temperature $T_f$ (unit: ° C.), water resistance H (unit: mL), acid resistance S (unit: mg/$dm^2$), alkali resistance (unit: mg/$dm^2$); processing temperature VA (unit: ° C.); wherein n.d. means not determined.

TABLE 1

Composition of glass (weight percent, % by weight or wt %, based on oxides) and main properties

| Components | A1 | A2 | A3 | A4 | A5 | A6 | A7 | A8 |
|---|---|---|---|---|---|---|---|---|
| $SiO_2$ | 73.19 | 73.73 | 75.53 | 74.01 | 75.61 | 75.80 | 73.53 | 73.49 |
| $B_2O_3$ | 10.64 | 10.71 | 9.91 | 11.00 | 9.37 | 9.94 | 10.41 | 10.71 |
| $Al_2O_3$ | 5.59 | 5.63 | 4.84 | 4.83 | 4.84 | 4.05 | 6.42 | 5.63 |
| CaO | 1.32 | 1.33 | 0.44 | 0.89 | 0.89 | 0.89 | 0.66 | 1.33 |
| MgO | 0.00 | 0.00 | 0.32 | 0.32 | 0.32 | 0.32 | 0.16 | 0.00 |
| BaO | 0.60 | 0.61 | 1.21 | 1.21 | 1.21 | 1.22 | 0.60 | 0.61 |
| $Na_2O$ | 6.56 | 6.60 | 5.88 | 5.87 | 5.89 | 5.90 | 6.83 | 6.85 |
| $K_2O$ | 0.37 | 0.37 | 0.74 | 0.74 | 0.75 | 0.75 | 0.37 | 0.37 |
| $Li_2O$ | 0.12 | 0.12 | 0.24 | 0.24 | 0.24 | 0.24 | 0.12 | 0.12 |
| $CeO_2$ | 0.10 | 0.10 | 0.10 | 0.10 | 0.10 | 0.10 | 0.10 | 0.10 |
| NaCl | 0.30 | 0.30 | 0.30 | 0.30 | 0.30 | 0.30 | 0.30 | 0.30 |
| $Y_2O_3$ | 0.25 | 0.50 | 0.50 | 0.50 | 0.50 | 0.50 | 0.50 | 0.50 |
| $La_2O_3$ | 0.98 | — | — | — | — | — | — | — |
| $ZrO_2$ | — | — | — | — | — | — | — | — |
| ZnO | — | — | — | — | — | — | — | — |
| Coefficient of linear thermal expansion ($\times 10^{-6}$/K) | 5.01 | 4.98 | 4.63 | 4.71 | 4.72 | 4.61 | 4.90 | 4.86 |
| $T_g$ (° C.) | 584.3 | 583.3 | 572.2 | 573.7 | 576.3 | 576.5 | 575.4 | 585.6 |
| $T_f$ (° C.) | 652.1 | 647.2 | 640.9 | 645.0 | 642.9 | 644.2 | 640.3 | 652.1 |
| H (mL) | 0.03 | 0.02 | 0.02 | 0.02 | 0.03 | 0.02 | 0.03 | 0.03 |
| S (mg/dm²) | 0.41 | 0.53 | 0.45 | 0.62 | 0.51 | 0.37 | 0.56 | 0.51 |
| L (mg/dm²) | 63.03 | 72.00 | 62.31 | 65.02 | 64.23 | 68.07 | 68.49 | 69.56 |
| $V_A$ (° C.) | n.d. | 1246 | n.d. | n.d. | n.d. | n.d. | n.d. | n.d. |

TABLE 2

Composition of glass (weight percent, % by weight or wt %, based on oxides) and main properties

| Components | A9 | A10 | A11 | A12 | A13 | A14 | A15 | A16 |
|---|---|---|---|---|---|---|---|---|
| $SiO_2$ | 73.37 | 72.65 | 71.95 | 71.61 | 71.37 | 73.35 | 71.88 | 73.43 |
| $B_2O_3$ | 10.66 | 10.56 | 10.46 | 10.41 | 10.40 | 9.62 | 10.68 | 9.10 |
| $Al_2O_3$ | 5.61 | 5.55 | 5.50 | 5.47 | 5.47 | 4.70 | 4.69 | 4.70 |
| CaO | 1.32 | 1.31 | 1.30 | 1.29 | 1.29 | 0.43 | 0.86 | 0.86 |
| MgO | 0.00 | 0.00 | 0.00 | 0.00 | 0.00 | 0.31 | 0.31 | 0.31 |
| BaO | 0.60 | 0.60 | 0.59 | 0.59 | 0.59 | 1.18 | 1.18 | 1.18 |
| $Na_2O$ | 6.57 | 6.51 | 6.44 | 6.41 | 6.65 | 5.71 | 5.70 | 5.72 |
| $K_2O$ | 0.37 | 0.37 | 0.36 | 0.36 | 0.36 | 0.72 | 0.72 | 0.72 |
| $Li_2O$ | 0.12 | 0.12 | 0.12 | 0.11 | 0.11 | 0.23 | 0.23 | 0.23 |
| $CeO_2$ | 0.10 | 0.10 | 0.10 | 0.10 | 0.10 | 0.10 | 0.10 | 0.10 |
| NaCl | 0.30 | 0.29 | 0.29 | 0.29 | 0.29 | 0.29 | 0.29 | 0.29 |
| $Y_2O_3$ | 0.99 | 1.95 | 2.90 | 3.37 | 0.48 | 0.48 | 0.48 | 0.48 |
| $La_2O_3$ | — | — | — | — | 0.96 | 0.96 | 0.96 | 0.96 |
| $ZrO_2$ | — | — | — | — | 0.96 | 0.96 | 0.96 | 0.96 |
| ZnO | — | — | — | — | 0.96 | 0.96 | 0.96 | 0.96 |
| Linear thermal expansion coefficient ($\times 10^{-6}$/K) | 5.07 | 5.00 | 5.11 | 4.94 | 5.04 | 4.81 | 4.68 | 4.71 |
| $T_g$ (° C.) | 584.3 | 586.9 | 593.8 | 594.9 | 586.0 | 574.8 | 576.7 | 583.0 |
| $T_f$ (° C.) | 644.5 | 654.9 | 662.0 | 659.1 | 660.2 | 647.2 | 648.7 | 659.0 |
| H (mL) | 0.02 | 0.03 | 0.03 | 0.03 | 0.03 | 0.02 | 0.03 | 0.03 |
| S (mg/dm²) | 0.57 | 0.53 | 0.63 | 0.65 | 0.52 | 0.57 | 0.56 | 0.41 |
| L (mg/dm²) | 61.04 | 55.83 | 39.78 | 58.18 | 56.20 | 51.44 | 53.09 | 47.12 |
| $V_A$ (° C.) | n.d. | n.d. | n.d. | n.d. | n.d. | n.d. | n.d. | n.d. |

TABLE 3

Composition of glass (weight percent, % by weight or wt %, based on oxides) and main properties

| Components | Number | | | | | | | | |
|---|---|---|---|---|---|---|---|---|---|
| | A17 | A18 | A19 | A20 | A21 | A22 | A23 | A24 | A25 |
| $SiO_2$ | 73.62 | 71.41 | 73.19 | 73.19 | 73.37 | 72.65 | 71.95 | 71.95 | 70.59 |
| $B_2O_3$ | 9.66 | 10.11 | 10.64 | 10.64 | 10.66 | 10.56 | 10.46 | 10.46 | 10.26 |
| $Al_2O_3$ | 3.93 | 6.23 | 5.59 | 5.59 | 5.61 | 5.55 | 5.50 | 5.50 | 5.39 |
| CaO | 0.86 | 0.64 | 1.32 | 1.32 | 1.32 | 1.31 | 1.30 | 1.30 | 1.27 |
| MgO | 0.31 | 0.15 | 0.00 | 0.00 | 0.00 | 0.00 | 0.00 | 0.00 | 0.00 |
| BaO | 1.18 | 0.59 | 0.60 | 0.60 | 0.60 | 0.60 | 0.59 | 0.59 | 0.58 |
| $Na_2O$ | 5.73 | 6.63 | 6.56 | 6.56 | 6.57 | 6.51 | 6.44 | 6.44 | 6.32 |
| $K_2O$ | 0.73 | 0.36 | 0.37 | 0.37 | 0.37 | 0.37 | 0.36 | 0.36 | 0.36 |
| $Li_2O$ | 0.23 | 0.11 | 0.12 | 0.12 | 0.12 | 0.12 | 0.12 | 0.12 | 0.11 |
| $CeO_2$ | 0.10 | 0.10 | 0.10 | 0.10 | 0.10 | 0.10 | 0.10 | 0.10 | 0.09 |
| NaCl | 0.29 | 0.29 | 0.30 | 0.30 | 0.30 | 0.29 | 0.29 | 0.29 | 0.28 |
| $Y_2O_3$ | 0.48 | 0.48 | 0.25 | 0.25 | 0.49 | 0.98 | 1.93 | 1.93 | 0.95 |
| $La_2O_3$ | 0.96 | 0.96 | — | — | — | 0.98 | 0.97 | — | — |
| $ZrO_2$ | 0.96 | 0.96 | 0.98 | — | 0.49 | — | — | 0.97 | 3.80 |
| ZnO | 0.96 | 0.96 | — | 0.98 | — | — | — | — | — |
| Linear thermal expansion coefficient ($\times 10^{-6}$/K) | 4.82 | 5.06 | 4.87 | 4.84 | 4.97 | 5.15 | 5.04 | 4.92 | 4.89 |
| $T_g$ (° C.) | 581.4 | 580.3 | 587.4 | 578.2 | 581.3 | 584.1 | 589.0 | 589.9 | 591.6 |
| $T_f$ (° C.) | 652.7 | 638.7 | 656.1 | 642.9 | 642.1 | 643.6 | 656.2 | 652.4 | 661.2 |
| H (mL) | 0.02 | 0.02 | 0.03 | 0.02 | 0.03 | 0.02 | 0.02 | 0.03 | 0.02 |
| S (mg/dm$^2$) | 0.35 | 0.54 | 0.43 | 0.48 | 0.45 | 0.53 | 0.62 | 0.61 | 0.59 |
| L (mg/dm$^2$) | 59.40 | 54.68 | 62.55 | 68.27 | 54.76 | 57.76 | 39.16 | 40.10 | 41.23 |
| $V_A$ (° C.) | n.d. | n.d. | n.d. | 1236 | n.d. | n.d. | n.d. | n.d. | n.d. |

It's clearly known according to the embodiments shown in tables 1-3 of the invention that:

The glass of the invention has good chemical stability, specifically, when the water resistance is tested at 98° C. according to YBB00362004-2015, the degree of water erosion of glass is measured by volume of hydrochloric acid titration solution (0.01 mol/L) consumed by glass particles per gram, and the value is at most 0.03 ml. This indicates that the glass of the present invention is excellent in water resistance which belongs to class 1 water resistance.

When the alkali resistance is tested according to YBB00352004-2015, the mass loss per unit surface area of the glass test sample is less than 75 mg/dm$^2$. This indicates that the glass of the present invention is excellent in alkali resistance which belongs to alkali-resistant class 1.

When the acid resistance is tested according to YBB00342004-2015, the mass loss per unit surface area of the glass test sample is less than 0.70 mg/dm$^2$. This indicates that the glass of the present invention is also excellent in acid resistance which belongs to acid-resistant class 1. Therefore the glass of the invention is 1-1-1 glass, that is, the glass belongs to class 1 in every aspect of the three chemical resistances.

Thus, the highly chemical resistant glass of the present invention is well suited for use in medical packaging materials, and use as equipment for chemical industry production and laboratory research, and as containers for chemically erosive liquid.

The viscosity of the glass in the cooling zone is characterized by the glass transition temperature $T_g$, which corresponds to a viscosity of approximately $10^{13.4}$ dPa·s. The suitable transition temperature obtained by the glass of the invention is advantageous in reducing the energy consumption in the production process.

The coefficient of linear thermal expansion α20/300 of the glass of the invention is from $4.6 \times 10^{-6}$/K to $5.2 \times 10^{-6}$/K, which is similar to that of molybdenum or KOVAR™. Therefore, the glass successfully capable of fusing with molybdenum, KOVAR™ can act as sealing glass of such metals, and is suitable for use in molten glass/metal seals used in chemically corrosive environments due to the good chemical resistance of the glass. One skilled in the art can vary the coefficient of linear thermal expansion by the content of alkali metal oxide.

The glass of the present invention is easily converted into glass fibers. Due to the good chemical resistance of the glass, which leads to an increase in its long-term durability, these glass fibers are extremely suitable for reinforcing concrete parts, and can be used as short fibers and filaments (production of concrete/glass fiber composites).

Related person can clearly realize and apply the techniques disclosed herein by making some changes, appropriate alterations or combinations to the methods without departing from spirit, principles and scope of the present disclosure. Skilled in the art can learn from this article to properly improve the process parameters to implement the preparation method. Of particular note is that all similar substitutions and modifications to the skilled person is obvious, and they are deemed to be included in the present invention.

What is claimed is:

1. A borosilicate glass comprising the following constituents based on oxide:

| | |
|---|---|
| $SiO_2$ | 70-77 wt %, |
| $B_2O_3$ | 9.0-12 wt %, |
| $Al_2O_3$ | 3.0-7.0 wt %, |
| $Na_2O$ | 5.0-8.0 wt %, |
| $K_2O$ | 0-2.0 wt %, |
| $Li_2O$ | 0-1.0 wt %, |
| wherein Σ($Na_2O + K_2O + Li_2O$) | 5.0-8.0 wt %, |
| CaO | 0-3.0 wt %, |
| MgO | 0-1.0 wt %, |
| BaO | 0-2.0 wt %, |
| wherein Σ(CaO + MgO + BaO) | 0-5.0 wt %, |
| $CeO_2$ | 0-1.0 wt %, |

| | |
|---|---|
| NaCl | 0-1.0 wt %, |
| Y$_2$O$_3$ | 0.25-4.0 wt %. |

2. The borosilicate glass of claim 1 comprising at least one of La$_2$O$_3$, ZrO$_2$, and ZnO in a total amount from 0.49 to 4.0 wt %, wherein the content of each oxide is independently from 0 to 4.0 wt %.

3. The borosilicate glass of claim 1 comprising at least one of La$_2$O$_3$, ZrO$_2$, and ZnO in a total amount from 0.49 to 3.0 wt %%, wherein the content of each oxide is independently from 0 to 3.0 wt %.

4. The borosilicate glass of claim 1, wherein the borosilicate glass is free of As$_2$O$_3$ and/or Sb$_2$O$_3$ apart from inevitable impurities.

5. The borosilicate glass of claim 1, having a coefficient of linear thermal expansion α20/300 from $4.6 \times 10^{-6}$/K to $5.2 \times 10^{-6}$/K, a class 1 water resistance according to YBB00362004-2015, a class 1 acid resistance according to YBB00342004-2015, and/or a class 1 alkali resistance according to YBB00352004-2015.

6. A process of using the borosilicate glass of claim 1, wherein the glass is melted and formed into an article for a packaging material for a pharmaceutical, a container or a chemical device for a chemically erosive liquid, a sealing glass for an alloy or a glass fiber.

7. The process of claim 6, wherein the glass fiber is for reinforcing concrete.

8. A borosilicate glass comprising the following constituents based on oxide:

| | |
|---|---|
| SiO$_2$ | 70-76 wt %, |
| B$_2$O$_3$ | 9.0-11.5 wt %, |
| Al$_2$O$_3$ | 3.5-6.5 wt %, |
| Na$_2$O | 5.0-7.0 wt %, |
| K$_2$O | 0-1.0 wt %, |
| Li$_2$O | 0-1.0 wt %, |
| wherein Σ(Na$_2$O + K$_2$O + Li$_2$O) | 6.5-8.0 wt %, |
| CaO | 0-2.0 wt %, |
| MgO | 0-1.0 wt %, |
| BaO | 0-1.5 wt %, |
| wherein Σ(CaO + MgO + BaO) | 0-4.5 wt %, |
| CeO$_2$ | 0-0.5 wt %, |
| Y$_2$O$_3$ | 0.5-3.5 wt %. |

9. The borosilicate glass of claim 8, comprising at least one of La$_2$O$_3$, ZrO$_2$, and ZnO in a total amount from 0.49 to 4.0 wt %, wherein the content of each oxide is independently from 0 to 4.0 wt %.

10. The borosilicate glass of claim 8, comprising at least one of La$_2$O$_3$, ZrO$_2$, and ZnO in a total amount from 0.49 to 3.0 wt %, wherein the content of each oxide is independently from 0 to 3.0 wt %.

11. The borosilicate glass of claim 8, wherein the borosilicate glass is free of As$_2$O$_3$ and/or Sb$_2$O$_3$ apart from inevitable impurities.

12. The borosilicate glass of claim 8, having a coefficient of linear thermal expansion $α_{20/300}$ from $4.6 \times 10^{-6}$/K to $5.2 \times 10^{-6}$/K, a class 1 water resistance according to YBB00362004-2015, a class 1 acid resistance according to YBB00342004-2015, and/or a class 1 alkali resistance according to YBB00352004-2015.

13. A process of using the borosilicate glass of claim 8, wherein the glass is melted and formed into an article for a packaging material for a pharmaceutical, a container or a chemical device for a chemically erosive liquid, a sealing glass for an alloy or a glass fiber.

14. A borosilicate glass comprising the following constituents based on oxide:

| | |
|---|---|
| SiO$_2$ | 71-75.5 wt %, |
| B$_2$O$_3$ | 9.1-11.0 wt %, |
| Al$_2$O$_3$ | 3.8-6.5 wt %, |
| Na$_2$O | 5.5-7.0 wt %, |
| K$_2$O | 0-1.0 wt %, |
| Li$_2$O | 0-0.5 wt %, |
| wherein Σ(Na$_2$O + K$_2$O + Li$_2$O) | 6.0-8.0 wt %, |
| CaO | 0-1.5 wt %, |
| MgO | 0-0.5 wt %, |
| BaO | 0.5-1.5 wt %, |
| wherein Σ(CaO + MgO + BaO) | 0.5-3.5 wt %, |
| CeO$_2$ | 0-1.0 wt %, |
| NaCl | 0-1.0 wt %, |
| Y$_2$O$_3$ | 0.5-3.0 wt %. |

15. The borosilicate glass of claim 14, comprising at least one of La$_2$O$_3$, ZrO$_2$, and ZnO in a total amount from 0.49 to 4.0 wt %, wherein the content of each oxide is independently from 0 to 4.0 wt %.

16. The borosilicate glass of claim 14, comprising at least one of La$_2$O$_3$, ZrO$_2$, and ZnO in a total amount from 0.49 to 3.0 wt %, wherein the content of each oxide is independently from 0 to 3.0 wt %.

17. The borosilicate glass of claim 14, wherein the borosilicate glass is free of As$_2$O$_3$ and/or Sb$_2$O$_3$ apart from inevitable impurities.

18. The borosilicate glass of claim 14, having a coefficient of linear thermal expansion $α_{20/300}$ from $4.6 \times 10^{-6}$/K to $5.2 \times 10^{-6}$/K, a class 1 water resistance according to YBB00362004-2015, a class 1 acid resistance according to YBB00342004-2015, and/or a class 1 alkali resistance according to YBB00352004-2015.

19. A process of using the borosilicate glass of claim 14, wherein the glass is melted and formed into an article for a packaging material for a pharmaceutical, a container or a chemical device for a chemically erosive liquid, a sealing glass for an alloy or a glass fiber.

* * * * *